F. O. BLACKWELL AND H. W. BUCK.
HIGH TENSION INSULATOR.
APPLICATION FILED JULY 17, 1915.
1,362,388.
Patented Dec. 14, 1920.
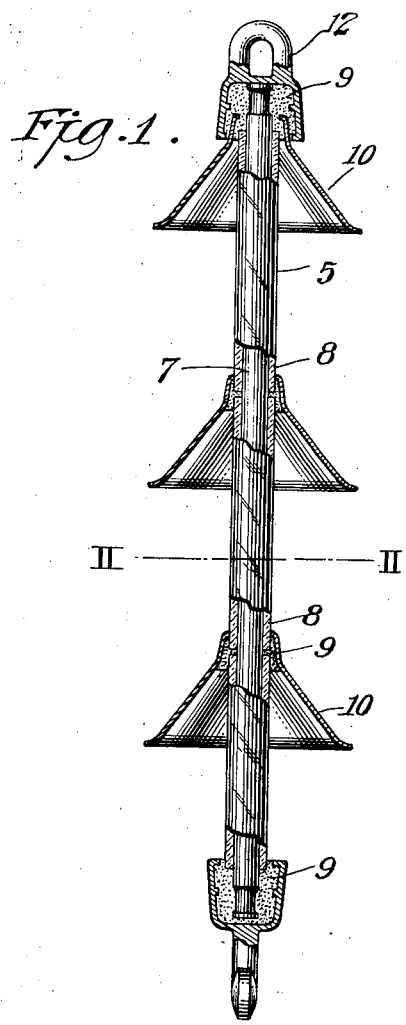
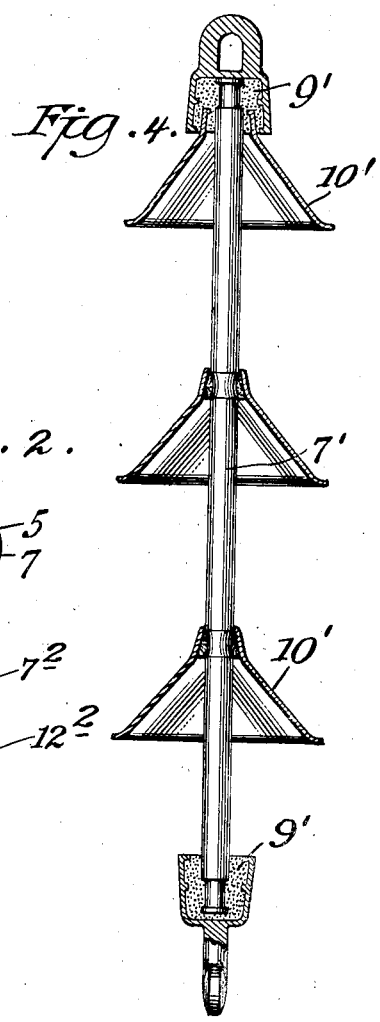
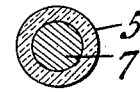
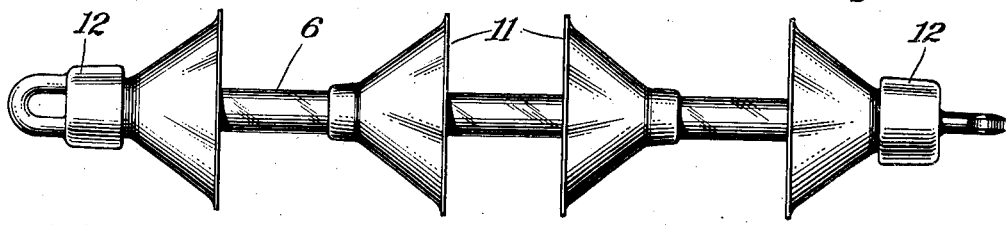

UNITED STATES PATENT OFFICE.

FRANCIS O. BLACKWELL, OF ENGLEWOOD, NEW JERSEY, AND HAROLD W. BUCK, OF HEWLETT, NEW YORK, ASSIGNORS TO GENERAL ELECTRIC COMPANY, A CORPORATION OF NEW YORK.

HIGH-TENSION INSULATOR.

1,362,388.    Specification of Letters Patent.    Patented Dec. 14, 1920.

Application filed July 17, 1915. Serial No. 40,382.

*To all whom it may concern:*

Be it known that we, FRANCIS O. BLACKWELL and HAROLD W. BUCK, citizens of the United States, residing, respectively, at Englewood, Bergen county, New Jersey, and at Hewlett, Nassau county, New York, have jointly invented new and useful Improvements in High-Tension Insulators, of which the following is a specification, reference being had to the accompanying drawings, in which—

Figure 1 is an elevation partly in section of an insulator intended to be used as a suspension insulator in a high tension power transmission line; Fig. 2 is a section on lines II—II of Fig. 1; Fig. 3 is an elevation of an insulator embodying our invention, and intended to be used as a dead-end or strain insulator; Fig. 4 shows an elevation of a modified form of an insulator embodying our invention, and Fig. 5 shows a modified form of the insulator.

Our invention relates to the suspension of electric conductors, and is particularly adapted for use in high tension power transmission systems. In the electrical transmission of power by high tension current, great difficulty has been encountered in obtaining proper insulation for the line conductors, especially those using upward of 60,000 volts, and the object of our invention is to provide an insulator of a character which has the necessary mechanical strength to support the line, and at the same time is highly resistant to "puncture" and "arcing over," and also to deterioration under severe weather and electrical conditions. Our invention also consists in the construction and coöperation of the various parts which we shall hereinafter describe and claim.

Referring to the drawings, in which we have shown our insulator in a form suitable for application to the suspension of a high tension power transmission line in a system such as is described in the Buck and Hewlett Patent No. 925,561, dated June 22, 1909, the numeral 5 indicates insulators of the suspension type, and 6 insulators of the strain or dead-end type. The insulator 5 is comprised of a rod 7 of high insulating value, and of great mechanical strength, and is preferably inclosed in a sleeve or tube 8 of insulating material such as porcelain, which may be made in sections secured together by a cementitious compound 9. Arranged upon the rod 7, and superimposed upon the sleeve 8, are one or more metal hoods 10, which act as rain sheds to keep portions of the insulator dry, and also serve to break up the electro-static field and assist in maintaining the air about it in an insulating condition. The bottom edges of the hoods are flared outwardly so as to increase the arcing resistance between adjacent metal parts. We have found that the insulating values of our insulators are increased by using such hood or hoods because the metal of which the hoods are made has a distributive action and serves to diffuse the electrical stresses and thereby assists in preventing "arcing over."

With the suspension type of insulator 5, as the rain normally falls in a direction not more than forty-five degrees from the perpendicular, the hoods 10 are made to extend in one direction only, to maintain a dry surface on the insulator to prevent surface leakage, but with the strain type of insulator, which is normally suspended in a position approximating the horizontal, to maintain dry surfaces and thereby prevent creepage, it is necessary to protect the insulator from rain in all directions, and hence we have provided hoods 11, extending in opposite directions, so that no matter in which direction the rain may be driven against the hoods some portion of the insulator will always be kept dry.

Cemented or otherwise connected to the ends of the insulators are iron caps 12, preferably equipped with hooks or eyes, through which the insulators may be connected to the cross arms of the towers and to the conductors by suitable securing means.

We have found that rods consisting of a phenolic, synthetic resin, reinforced with laminated material of vegetable fiber origin, or of bakelite with a vegetable fibrous binder are best suited for our purpose. Such materials provide a rod of extremely high insulating value, of very great mechanical strength, being approximately of 20,000 pounds per square inch. They also have a high melting point, a high carbonizing point, and can be machined with comparative ease.

While the material of which the rod 7 is composed has a high resistance to carbonization, it is preferably protected by the sleeves or tubes 8, and as these sections are cemented together at the joints and at the terminal connections, the rod or axis 7 is hermetically sealed therein, and is kept clean and dry so that there is no tendency for electric leakage to take place along its surface. All surface leakage or "arcing over" therefore involves only the sleeve or tube 8, which is not carbonizable and cannot be injured in such respect. As all mechanical strains are taken up by the rods 7 the sleeves 8 are under no mechanical tension, and hence can be made of comparatively fragile material such as thin porcelain tubes.

Insulators constructed in accordance with our invention have been tested to upward of 300,000 volts, without failure.

In Fig. 4 we have shown the hoods 10' superimposed directly on the rod 7', and secured thereto by a cementitious material 9'. We have found that such a construction gives very good results, although we prefer to use the structure shown in Figs. 1–3.

In Fig. 5 we have shown a further modification of the means for attaching the caps $12^2$ to the rods $7^2$, which consists in threading the ends of the rods and in providing corresponding threads in the interior of the caps.

The terms and expressions which we have employed are used as terms of description and not of limitation, and we have no intention in the use of such terms and expressions of excluding any equivalents for the features shown and described, but recognize that various modifications (such as variations in the length of rods, size, number and arrangement of hoods) are possible within the scope of the invention claimed.

We have found that insulators constructed in accordance with our invention have a constant potential gradient due to the fact that the insulator is made of insulating material throughout its entire length and has no metal or conducting parts interposed in the body of the rod between the terminals thereof, and hence the electrical stresses per unit of length are extremely low at all points throughout the length of the insulator.

What we claim is:

1. An insulator for high tension conductors, comprising a dense rod consisting of a phenolic, synthetic resin, reinforced with fibrous material and of high insulating value and great mechanical strength, securing means at each end of the rod, and means for maintaining a portion of the insulator dry, said means comprising a metal hood.

2. An insulator for high tension conductors, comprising a dense rod consisting of a phenolic, synthetic resin, reinforced with fibrous material and of high insulating value and great tensile strength, caps secured to the ends of the rod for attachment to a conductor and a support, a highly refractory insulating shell surrounding said rod, and means for maintaining portions of the exterior of the rod dry under weather conditions.

3. An insulator for high tension conductors having an elongated central member of a high insulating value and great mechanical strength, a refractory shell surrounding the central member and adapted to keep it dry, and a plurality of metal hoods arranged at intervals along said rod adapted to protect said rod against rain and to maintain the surrounding atmosphere at a high insulating value.

4. An insulator for high tension conductors, comprising a rod of high insulating value and great mechanical strength, and means for maintaining the surface of the insulator dry, said means consisting of oppositely directed metallic flanges arranged about the longitudinal axis of the rod.

5. An insulator for high tension conductors, comprising an inflexible rod having a high insulating value and being of a strength of approximately 20,000 pounds per square inch, caps secured to the ends of each rod for attachment to a conductor and a support, said rod having a plurality of metal hoods mounted thereon to protect the rod against rain and to distribute the electrostatic stress in the surrounding atmosphere, the hoods having their edge away from the rod flared outward so as to increase the arcing resistance between adjacent metal parts.

6. An insulator for high tension conductors, comprising a shaft, terminals upon the shaft, one of which is secured to a support and the other to the line, and hoods of conducting material superimposed upon and secured to said shaft adapted to keep surface portions of the shaft dry, said shaft comprising between its terminals a solid and continuous piece of insulating material capable of withstanding upward of 60,000 volts under normal service conditions.

7. An insulator for high tension conductors comprising a rod of high insulating value and great mechanical strength, an insulating shell surrounding said rod, said shell being made in a plurality of sections cemented together and forming with the terminals on said rod a hermetical seal for the rod, and means for maintaining surface portions of the insulator dry.

FRANCIS O. BLACKWELL.
HAROLD W. BUCK.